Aug. 15, 1961 H. J. C. NIEUWENHOVEN 2,995,997
MIRROR CAMERA PROVIDED WITH A DIAPHRAGM
Filed April 28, 1958
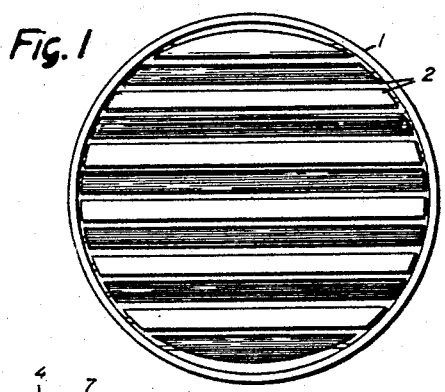
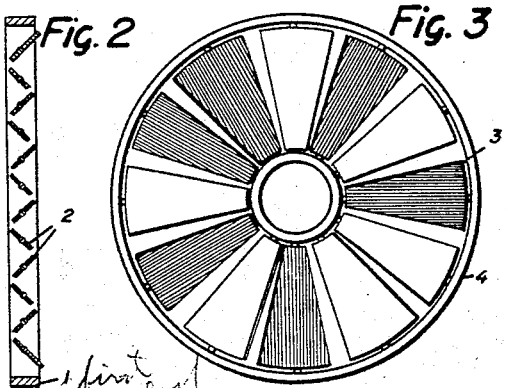
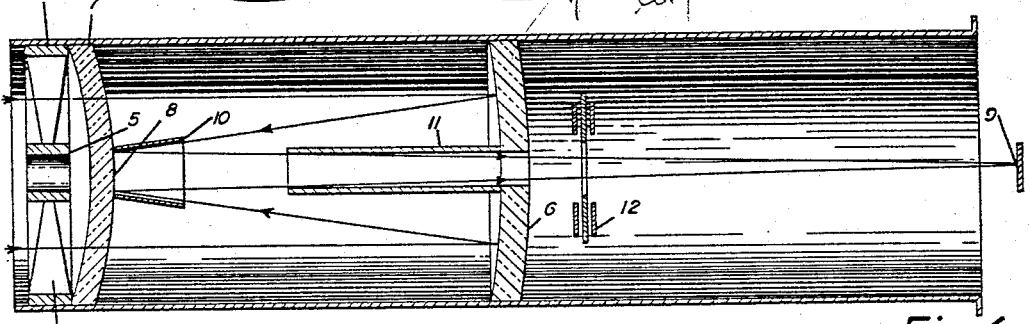
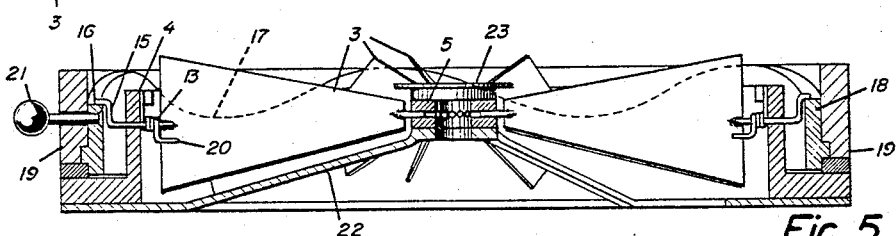
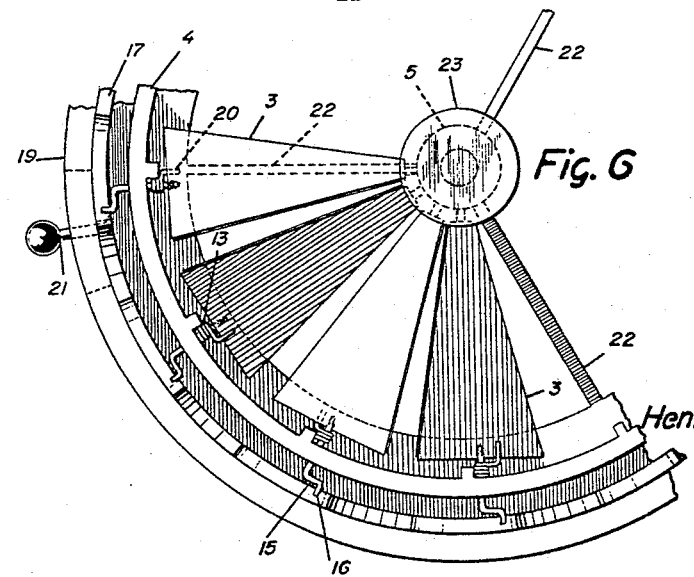
INVENTOR
Henricus Jacobus Cornelius Nieuwenhoven
by Wenderoth, Lind & Ponack
ATTORNEYS United States Patent Office 2,995,997
Patented Aug. 15, 1961

2,995,997
MIRROR CAMERA PROVIDED WITH
A DIAPHRAGM
Hendricus Jacobus Cornelis Nieuwenhoven, Rijswijk, Netherlands, assignor to N.V. Optische Industrie "De Oude Delft," Delft, Netherlands
Filed Apr. 28, 1958, Ser. No. 731,353
Claims priority, application Netherlands May 2, 1957
4 Claims. (Cl. 95—64)

The invention relates to mirror cameras and has for its object the provision of a diaphragm, for adjusting the aperture of such cameras.

The employment in mirror cameras of an iris diaphragm such as is usual in cameras with lens objectives, is attended by serious difficulties. In all mirror objectives, as is well known, the central portion of the light beam is intercepted by the image carrier or by a secondary mirror or similar element, as a result of which the entrance pupil of the objective is generally ring-shaped. The diffraction image of the ring-shaped aperture shows the effect, in comparison with the image of a corresponding full-circle image, that the diameter of the Airy diffraction disk is somewhat smaller and that the intensity of illumination in the diffraction rings surrounding this disk is increased at the cost of the light intensity in the disk itself (see Dr. A. Bouwers, Achievements in Optics, pages 51 and 52, Elsevier, 1950). The use of an iris diaphragm would imply that the entrance pupil is under certain conditions reduced to a narrow ring, causing extensive distribution of the light over the diffraction rings, accompanied by loss of contrast.

Another disagreeable phenomenon attending the use of an iris diaphragm is that, owing to the central obstruction, points situated outside the plane of sharp definition are reproduced as rings which become thinner accordingly as the diaphragm aperture is reduced; the position is thus different from that obtained with lens objectives, which reproduce points situated outside the focal plane in such a way that they are seen as small disks. It is found that narrow rings are far more suggestive of a troublesome blur than solid disks of similar size, which means that reduction of the aperture of a mirror camera with an iris diaphragm entails an apparent lessening of depth definition.

It is possible to avoid difficulties of the kind described by using as exposure adjuster a grey filter having a variable absorptive power. This may, for instance, be a set of two movable wedges of neutral filter glass or a fluid filter in which the thickness of the absorbing fluid can be varied by moving a glass wall to and fro. Both methods result in mechanical complications, in addition to which they influence the position of the focal plane.

According to the invention the diaphragm of a mirror camera consists of a number of thin plates which can rotate simultaneously about axes situated in a plane perpendicular to the optical axis, the set-up being such that at one position the plates are situated in the plane of the axes of rotation and partly, if not entirely, close the aperture of the objective, whereas at another position the plates are situated in planes parallel to or passing through the optical axis and leave the aperture of the objective unobstructed.

In this way the entrance pupil of the objective is divided, as it were, into a number of sections which, on reduction of the diaphragm aperture, are gradually diminished and have a less adverse effect on the diffraction figure than an iris diaphragm. Their effect on the image formed of points outside the focal plane consists in the fact that the rings outside the plane of sharp definition become less bright, which does not make such a disagreeable impression as is the case when these rings become thinner at a constant brightness.

According to a first embodiment of the diaphragm the axes of all the blades are positioned parallel to each other, the direction of rotation of adjacent blades being opposite with respect to each other. This latter feature is an obvious necessity because, if the blades all rotated in the same direction, the diaphragm would be selective with respect to certain oblique rays and thus the desired object would not be achieved.

A very advantageous solution is obtained if the axes of rotation of the blades are radially positioned with respect to the optical axis. The breadth of the blades then increases preferably in a uniform manner from inside to outside. From the optical point of view this radial positioning offers advantages over the embodiment previously mentioned in that the diaphragm behaves in the same way with respect to all directions in the field of view. This is obviously not the case with a parallel-bladed diaphragm, whose blades may cause vignetting when dealing with oblique rays falling in planes perpendicular to the blades, whereas this phenomenon does not occur with rays falling parallel to the axes of rotation of the blades.

The diaphragm with radially positioned blades is also preferably constructed in such a way that alternate blades have opposite directions of rotation. This gives the maximum possible uniformity in the distribution of light over the entrance pupil.

Outlines of some embodiments of the invention are given in the drawings.

FIG. 1 shows the parallel-bladed diaphragm in front elevation;

FIG. 2 shows the same diaphragm in cross-section;

FIG. 3 shows a diaphragm with radial blades, in front elevation;

FIG. 4 shows this diaphragm in side elevation, mounted in a mirror objective which is reproduced in longitudinal section;

FIG. 5 is a sectional elevation of a control mechanism of a diaphragm with radial blades;

FIG. 6 is a plan view of the control mechanism and diaphragm as shown in FIG. 5.

The diaphragm of FIGURES 1 and 2 consists of a ring 1 and a number of thin, elongated blades 2, fitted at their ends with pins which are pivoted in ring 1. The blades are thus rotatable about parallel axes and, by means of devices known per se and not shown in the drawing, e.g. a set of two tie rods alternately hinged to the centres of the blades, can be moved into any position corresponding to the desired aperture of the diaphragm. The blades have alternate directions of rotation in order that the oblique rays emanating from top and bottom in FIG. 1 may be cut off to an equal extent.

In FIGURES 3 and 4 the diaphragm blades 3 are radially positioned and are pivoted in the concentric rings 4 and 5. They gradually increase in breadth from inside to outside. In this embodiment, too, alternate blades have opposite directions of rotation in order that, for instance, beams falling obliquely into the left-hand part of the objective in FIG. 3 may not be transmitted to a greater extent by the portion of the diaphragm situated above the optical axis than by the portion below the optical axis, which result in an uneven distribution of the light.

The mirror objective outlined in cross-section in FIG. 4 is a tele-objective consisting of the concave spherical mirror 6, the meniscus lens 7 and the convex intercepting mirror 8, which is mounted on the convex rear surface of the meniscus and reflects the light rays through a central opening in the concave mirror to the image plane 9. Items 10 and 11 are two rings for screening off direct light. The diaphragm is mounted in front of the meniscus lens, whilst a shutter 12 is fitted behind the mirror 6.

FIGS. 5 and 6 show an adjusting mechanism adapted for use with the diaphragm with radial blades according to FIGURES 3 and 4. Fitted to the ends of rods 13, by means of which the blades 3 are pivoted in a fixed ring 4, are small levers 15 whose ends are provided with pins 16. By means of small spiral springs 20 on the spindles of the blades, the pins 16 are kept pressed against the upper side 17 of a pivotable cam ring 18. This upper side has a periodical cam-shaped profile such that, on rotating the ring 18 through half a cam pitch, the levers 15 and hence the blades 3 rotate alternately in opposite senses. In the position shown in the drawing the pins 16 are approximately in the centre of the corresponding cam faces, blades 3 forming an angle of about 45° with the plane perpendicular to the optical axis. For instance, when ring 18 is rotated in a clockwise direction one blade turns to the left, while the blade adjacent to it turns to the right, until the two blades are situated in the aforementioned plane. If the ring is now rotated back in an anticlockwise direction the blades of the diaphragm move back until they are parallel to the optical axis. It is obvious that the profile of the ring should have a sawtooth like form if all the blades are required to have the same direction of rotation.

Ring 18 is mounted in tongue and groove relationship with a fixed ring 19. Knob 21 on ring 18 extends through an elongated aperture extending along the fixed ring 19 in the peripheral direction thereof. Radial arms 22 hold the center concentric ring 5 within the ring 4. Baffle plate 23 covers the ring 5.

I claim:

1. In a camera, the combination of an objective having an image forming concave mirror positioned for reflecting light rays entering said camera, back toward the direction from which the light rays enter the camera and toward the optical axis of the camera, a light receiving member positioned on the optical axis of the camera intercepting the reflected light rays from the concave mirror and obstructing a portion of a beam of light entering the camera from an object point and giving to the beam of light entering the camera a ring-shaped cross-section, and a diaphragm positioned relative to said objective so as to be in the path of light rays entering the camera prior to being reflected by said mirror, said diaphragm comprising a plurality of opaque thin elongated blades pivotable only about individual axes situated in the plane of the blades and in a plane perpendicular to the optical axis of the camera, a common mounting for said blades surrounding said objective, and means connected to said blades for varying the angular setting of said blades simultaneously to a position parallel to the light rays passing therethrough, whereby the effective aperture of the objective is divided into a plurality of elongated portions of variable width.

2. In a camera, the combination of an objective having an image forming concave mirror positioned for reflecting light rays entering said camera, back toward the direction from which the light rays enter the camera and toward the optical axis of the camera, a light receiving member positioned on the optical axis of the camera intercepting the reflected light rays from the concave mirror and obstructing a portion of a beam of light entering the camera from an object point and giving to the beam of light entering the camera a ring-shaped cross-section, and a diaphragm positioned relative to said objective so as to be in the path of light rays entering the camera prior to being reflected by said mirror, said diaphragm comprising a plurality of opaque thin elongated blades pivotable only about individual axes radial to the optical axis of the objective and in a plane perpendicular thereto, a common, circular mounting for the blades surrounding the aperture of the objective, and means connected to said blades for varying the angular setting of the blades simultaneously to a position parallel to the light rays passing therethrough, whereby the effective aperture of the objective is divided into a plurality of elongated portions of variable width.

3. The combination as claimed in claim 1 wherein said means for varying the angular setting of said blades imparts opposite rotations to alternate blades.

4. The combination as claimed in claim 2 wherein said means for varying the angular setting of said blades comprise a ring rotatably mounted on said circular mounting, a guiding surface on said ring having a plurality of sloping portions equal in number to said blades, eccentric pins connected to said blades, means on said pins tending to hold said pins in touch with said sloping portions of said guiding surface for imparting to said blades equal angular rotations when said ring is turned.

References Cited in the file of this patent

UNITED STATES PATENTS

| 735,498 | Hall | Aug. 4, 1903 |
|---|---|---|
| 2,356,178 | Poynter | Aug. 22, 1944 |
| 2,534,543 | Bullock | Dec. 19, 1950 |

FOREIGN PATENTS

| 383,224 | Great Britain | Nov. 10, 1932 |
|---|---|---|
| 595,157 | France | July 10, 1935 |
| 147,666 | Australia | Aug. 5, 1952 |
| 73,493 | Holland | Oct. 15, 1953 |